Sept. 29, 1931.  B. NEGRINI  1,825,198
TRUCK AND GUIDE MEMBER FOR ROLLER BLINDS
Filed May 12, 1931  2 Sheets-Sheet 1

B. Negrini
INVENTOR

By: Marks & Clerk
ATTYS

Sept. 29, 1931.         B. NEGRINI         1,825,198
TRUCK AND GUIDE MEMBER FOR ROLLER BLINDS
Filed May 12, 1931          2 Sheets-Sheet 2

B. Negrini
INVENTOR
By Marks & Clerk
Attys.

Patented Sept. 29, 1931

1,825,198

UNITED STATES PATENT OFFICE

BRUNO NEGRINI, OF BOLOGNA, ITALY

TRUCK AND GUIDE MEMBER FOR ROLLER BLINDS

Application filed May 12, 1931, Serial No. 536,913, and in Italy April 30, 1930.

This invention relates to an improved system of fitting roller blinds on wheeled trucks, especially adapted for use in connection with heavy steel roller blinds, and its object is to provide means for reducing the friction of the elements of the blind sliding against the mouth of the vertical guides.

The main object of the invention is to provide means whereby the raising or lowering of roller blinds can be accomplished with comparative ease.

Another object of the invention is to provide for an easy and reliable arrangement adapted to render it possible to fit a standard arrangement of truck and wall fitting for roller blinds to any and all the types of supporting walls.

Figure 1:
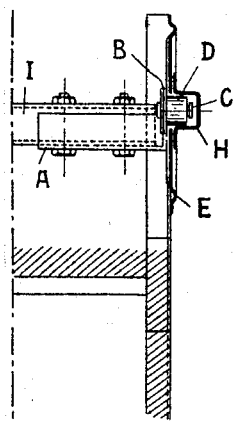
Figure 2:
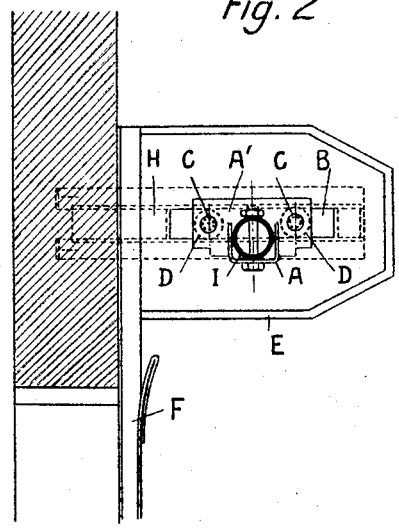
Figure 3:
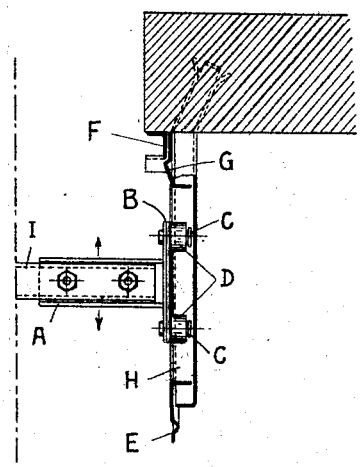
Figure 7:
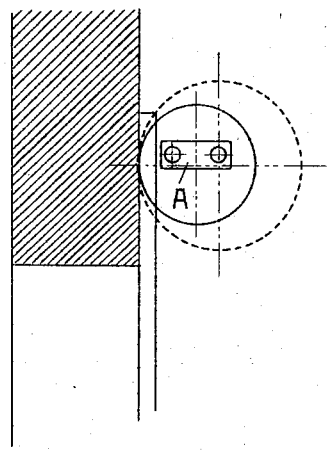
Figure 4:
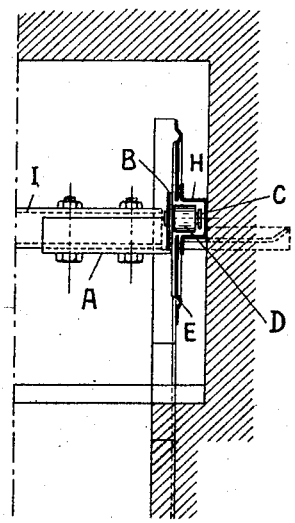
Figure 5:
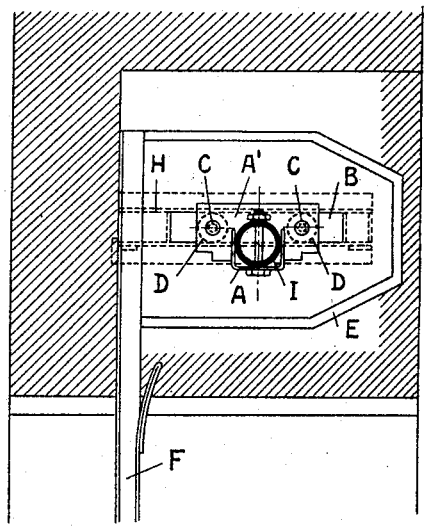
Figure 6:
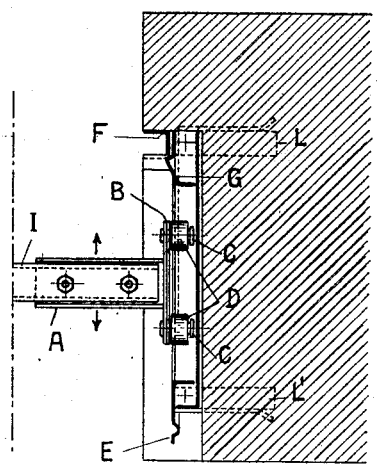
Figure 8:
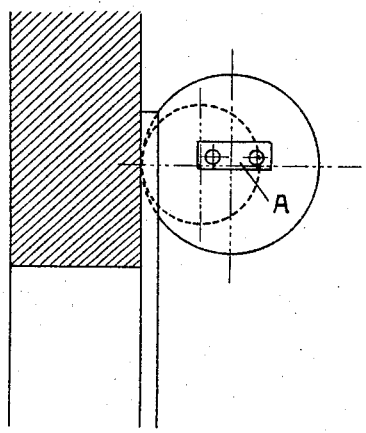

Two embodiments of the invention are shown in the annexed drawings in which:

Figures 1, 2 and 3 are respectively front, axial and top plan views of the improved arrangement of wheeled truck on horizontal channel-shaped bracket rails;

Figures 4, 5 and 6 are views like to the Figures 1, 2 and 3, respectively, and show the case in which the rails do not project out of the plane of the wall, and Figures 7 and 8 diagrammatically show the positions of the truck with the blind unwound and wound up respectively.

The above outlined arrangement comprises two distinct parts:

A movable member A, B, C, D or truck proper to which the tubular axle I is fastened, carries the winding drums of the roller blind and a fixed member E—H that is rigidly fastened to the wall.

The truck proper comprises two parts that are rigidly fastened together, i. e. a supporting member for the tubular axle I, the said member being formed from a rectangular piece of sheet iron, cut and bent up so as to take the shape as shown, i. e. comprising a channel member A coaxially of the axle I of the winding drums of the roller blind and a head plate A', bent upwardly at right angles to the axis of the channel and to which the plate B is fastened. The two pieces A' and B are connected by the pivots C which carry the rolls D of the truck.

The fixed part comprises a web plate E fastened to the channel-shaped vertical guide F of the elements of the roller blind and substantially parallel to the bottom of this guide. This web presents near the guide F a flared portion G, that is particularly useful when roller blinds are employed constituted of a number of slats having curled edges and interlocked together. In this case, should some slats come with their edges out of line with respect to the remaining slats, they would be again forced in line by sliding adjacent to the said flared portion G, before entering the mouth piece of the vertical guide. In this manner some of the edges of the slats may slide into close contact with the bottoms of the channel guides. To the said web plate E a horizontal rail H is fastened, on which the rollers D of the truck roll.

As it is apparent from Figure 6, this rail H, preferably of channel shape in the case of supporting members, projecting out of the wall, or bracket supports, is anchored by one of its suitably bent ends directly into the wall, while in the case of a guide encased in the wall the fixed portion is fastened as by means of bolts to a pair of stirrups L, L' previously encased into the wall.

Figures 7 and 8 clearly show how the variation of the diameter of the roll causes the displacement of the truck along the rails H, so as to maintain the roll, always tangent to the vertical guide F when the blind is partially or fully wound, thus avoiding the friction that would be produced if the drum axis were mounted in the position of completely wound up roller blind (Figure 8) as it should be in case of fixed rollers.

It is further apparent that by the adopted arrangement the horizontal displacements are automatic during the unwinding and winding up of the roller blind and thus each one of the elements of blind or slat entering the guide members aids to the horizontal movement of the trucks and parts supported thereby.

Having thus described my invention, I claim:

1. A truck and guide member for winding drums of roller blinds comprising in combination a channel-shaped guide for the edges of a roller blind, a mouthpiece for said guide, a web plate attached near the mouthpiece of the guide member; a flared portion on said web plate in a plane substantially parallel and slightly above the bottom of the vertical guide channels for the roller blind element, during unwinding thereof and adapted to align the edges of the elements of roller blind out of contact with the bottoms of the guides, a channel shaped horizontal rail member fastened to the wall in correspondence of each one of the said vertical guide members and a wheeled truck attached at each end of the supporting axle of the roller-blind winding drum and movable along said channel shaped rail members.

2. A truck and guide member for winding drums of roller blinds, according to claim 1, in which the rail members project like brackets out of the wall and the whole is supported by one portion of the rail members that has been previously bent and encased into the wall.

3. A truck and guide member for winding drums of roller blinds, according to claim 1, in which, each of the trucks is formed from a rectangle of sheet iron, cut and bent so as to form an axial channel-shaped part (A) in which end of the axle (I) for the winding drum of the roller blind is fitted and a head plate (A') bent at right angles to the axis of the channel and connected to a transverse plate (B) and to the pivots (C) of the truck wheels (D).

In testimony whereof I have signed my name to this specification.

BRUNO NEGRINI.